Oct. 14, 1941.  W. K. RANKIN  2,259,228
HIGH SPEED CAMERA
Filed Aug. 7, 1940
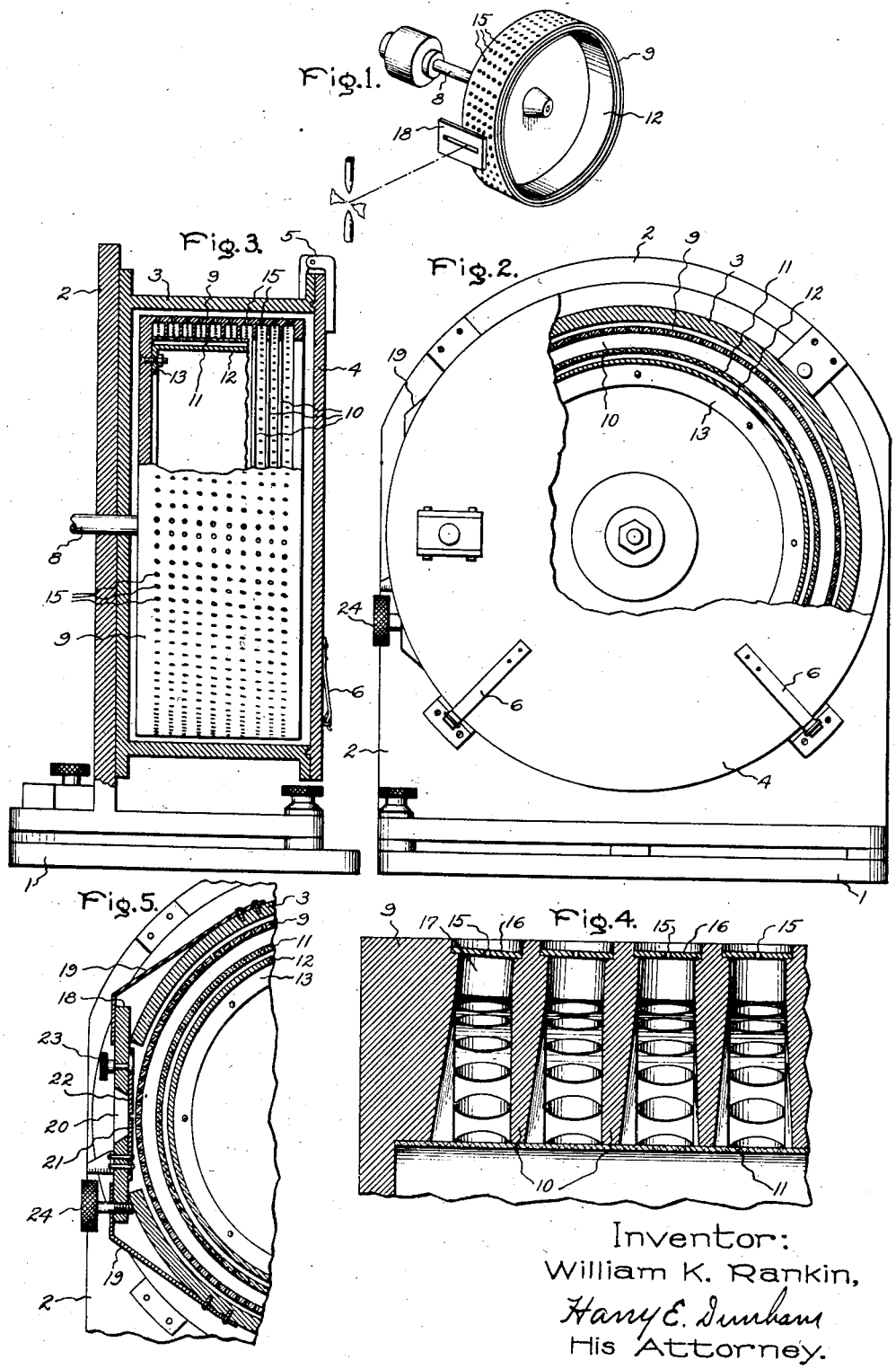
Inventor:
William K. Rankin,
Harry E. Dunham
His Attorney.

Patented Oct. 14, 1941

2,259,228

UNITED STATES PATENT OFFICE 2,259,228

HIGH SPEED CAMERA

William K. Rankin, Lansdowne, Pa., assignor to General Electric Company, a corporation of New York Application August 7, 1940, Serial No. 351,729

5 Claims. (Cl. 88—16)

My invention relates to high speed cameras and its object is to provide an improved construction of camera of this type. The camera which I have devised is of particular use in the study of phenomena which are accompanied by the production of a considerable amount of light such as the electric arcs produced in the operation of circuit breakers where in view of the intensity of the light produced a large number of pictures may be taken successively in a very short space of time.

My invention will be better understood from the following description taken in connection with the accompanying drawing and its scope will be pointed out in the appended claims.

Referring to the drawing, Fig. 1 is a small scale perspective view showing certain elements of a camera involving my invention; Fig. 2 is an end view of the complete camera; Fig. 3 is a vertical cross sectional view thereof, and Figs. 4 and 5 are detail views.

As illustrated by the drawing the camera comprises a frame structure including the base 1 and the vertical plate 2. Secured to this plate is the enclosing casing 3 which is shown drum-shaped, one end of which is closed by the door 4 having the hinge 5 and secured in closed position by the latches 6. Mounted within the casing 3 on the end of the drive shaft 8 which is journaled in the plate 2 and which may be driven by any suitable means such as an electric motor is the rotatable drum 9, the outer end or head of which is open. On its inner peripheral surface the drum is provided with the spaced flanges 10 against which the light sensitive film 11 is pressed by centrifugal force, the drum being constructed to rotate at a speed of 7200 R. P. M. To facilitate applying the film to the drum and for temporarily holding it in its approximate position for being exposed, the film in the camera described being a strip 4.5"x 40", the drum is provided with the cylindrical guide 12 having the flange 13 at one end thereof secured to the end head of the drum. The face of the drum is provided with a large number of exposure apertures 15, each .01" in diameter, which being without lenses function in the nature of a pin hole camera. These apertures are arranged in 10 circumferential rows between the flanges 10, each row having 100 apertures whereby when the drum is rotated at a speed of 7200 R. P. M. exposures at the rate of 120,000 per second are obtained. The apertures are also arranged in transverse rows each extending in a direction slightly inclined to the axis of rotation of the drum for the reason to be described later.

Referring now to Fig. 4 which shows the aperture construction drawn to a larger scale, it will be seen that each aperture is formed in a small thin plate 16 which is set into the outer surface of the drum for image projection between the flanges thereof. Inasmuch as the object to be photographed is assumed to be located at a certain distance from the camera, those plate 16 and associated holes 17 located adjacent the two ends of the drum are slightly inclined so that the latter converge toward the object. The flanges 10 adjacent the ends of the drum are shown cut away more on one side than on the other, whereby in effect they are inclined toward the corresponding ends of the drum so that the images on all of the pictures may be centrally located, the depth of the flanges being such that images are produced of the desired size.

The enclosing casing 3 at one side thereof is provided with an opening which is covered by the plate 18, shown secured to the casing by the members 19. This plate has the central opening 20 therein which in turn is partially covered by the two plates 21 and 22 of which the latter is made adjustable with respect to the former by means of a cam controlled by the knob 23 thereby forming an adjustable light slit extending axially of the drum and through which light is admitted to the apertures in the drum. The plate 18 is preferably provided with the adjusting screw 24 by which one may adjust the distance between the drum and the slit plates 21 and 22. As pointed out above the transverse rows of apertures in the drum are inclined to the axis of the drum. This inclination is such that as the drum rotates the apertures of each transverse row successively pass the slit between the plates 21 and 22 to make successive exposures of the film, the passing of the last aperture in a row being immediately followed by the passing of the first aperture of the next row and so on. Thus, during a single rotation of the drum all of the apertures of the entire series pass the slit in succession whereupon successive pictures are produced of the object being photographed. When the camera is used to photograph phenomena producing an abundance of light, such as electric arcs, ample light is admitted through each small aperture in the drum to give a sufficient exposure to record the phenomena even though the drum may be rotated at high speed. It will of course be understood that the total time required for making all of the exposures on the film is limited to that required for the drum to make one complete rotation, which at the speed mentioned above would be 1/120 of a second or 1/2 cycle of a 60 cycle alternating current. Lower speeds may of course be used where phenomena of greater length are to be photographed. In the event that the background or surrounding apparatus is insufficiently exposed adequately to be shown in the pictures to position the particular phenomenon being photographed which because of its brilliance may be correctly exposed notwithstanding the extreme shortness of each exposure I may prolong the exposure to bring out the background by continuing the rotation of the drum with the exposing slit open for the necessary length of time after the phenomena is over. If desired, however, such additional background exposure may be made before the main phenomenon is produced.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. A high speed camera comprising a rotatable drum adapted to receive a light sensitive film and having a series of spaced exposure apertures in the periphery thereof, said apertures forming a plurality of circumferential and transverse rows and an enclosing casing for said drum including a member having a narrow opening with which said apertures successively aline, said opening extending at a small angle to the direction of said transverse rows.

2. A high speed camera comprising a rotatable drum having a series of circumferential spacing ribs on the inner surface thereof against which a light sensitive film is adapted to be pressed by centrifugal force, said drum having a series of exposure apertures therein forming a plurality of circumferential rows and a plurality of transverse rows, an enclosing casing for said drum including a member having an exposure slit arranged close to said drum and extending at an angle to the direction of said transverse rows, and means for adjusting the width of said slit.

3. A high speed camera comprising a rotatable drum adapted to receive a light sensitive film and having a series of spaced exposure apertures in the periphery thereof forming circumferential and transverse rows, the apertures adjacent to the opposite ends of the drum being inclined in opposite directions to receive light from a common point spaced from the drum and an enclosing casing for said drum including an exposure plate having a narrow slit arranged to aline successively with the apertures forming each transverse row.

4. A high speed camera comprising a rotatable drum having a plurality of axially spaced internal flanges against which a light sensitive film is adapted to be pressed by centrifugal force and having a series of spaced exposure apertures between said flanges, a casing enclosing said drum having a door at one end thereof and having an opening opposite the periphery of the drum, and an aperture plate covering said opening having a light slit therein extending axially of said drum, the apertures in said drum forming circumferential rows and transverse rows inclined at a small angle with said slit.

5. A high speed camera comprising a rotatable drum having a plurality of spaced inwardly extending circumferential flanges for supporting a light sensitive film, said drum having rows of exposure apertures arranged between the flanges, and an enclosing member for the drum having an exposing slit arranged to cooperate successively with the apertures in the drum, certain of said flanges adjacent the ends of the drum being inclined toward said ends whereby the images of the object to be photographed are similarly located on all of the pictures.

WILLIAM K. RANKIN.